(12) United States Patent
Ishikawa et al.

(10) Patent No.: US 11,975,821 B2
(45) Date of Patent: May 7, 2024

(54) FLIGHT DEVICE

(71) Applicant: Ishikawa Energy Research Co., Ltd., Gunma (JP)

(72) Inventors: Mitsuru Ishikawa, Ota (JP); Taro Fukuda, Ota (JP); Takuma Takezawa, Ota (JP); Nobuyuki Tada, Ota (JP)

(73) Assignee: Ishikawa Energy Research Co., Ltd., Gunma (JP)

( * ) Notice: Subject to any disclaimer, the term of this patent is extended or adjusted under 35 U.S.C. 154(b) by 87 days.

(21) Appl. No.: 17/755,898

(22) PCT Filed: Oct. 27, 2020

(86) PCT No.: PCT/JP2020/040314
§ 371 (c)(1),
(2) Date: May 11, 2022

(87) PCT Pub. No.: WO2021/095518
PCT Pub. Date: May 20, 2021

(65) Prior Publication Data
US 2022/0388635 A1    Dec. 8, 2022

(30) Foreign Application Priority Data

Nov. 15, 2019    (JP) ................................. 2019-207210

(51) Int. Cl.
*B64C 25/12*       (2006.01)
*B64C 25/20*       (2006.01)
*B64C 39/02*       (2023.01)

(52) U.S. Cl.
CPC .............. *B64C 25/12* (2013.01); *B64C 25/20* (2013.01); *B64C 39/024* (2013.01)

(58) Field of Classification Search
CPC ....... B64C 25/12; B64C 25/20; B64C 39/024; B64C 25/24; B64C 25/26; B64C 25/10;
(Continued)

(56) References Cited

U.S. PATENT DOCUMENTS

| 1,485,775 | A | * | 3/1924 | Fales ....................... | B64C 25/12 |
| | | | | | 244/102 R |
| 2,014,777 | A | * | 9/1935 | Payne ..................... | B64C 25/10 |
| | | | | | 244/102 R |

(Continued)

FOREIGN PATENT DOCUMENTS

| CN | 203047530 U | 7/2013 |
| CN | 203246584 U | 10/2013 |

(Continued)

OTHER PUBLICATIONS

International Search Report issued in PCT/JP2020/040314; mailed Jan. 12, 2021.

(Continued)

*Primary Examiner* — Medhat Badawi
(74) *Attorney, Agent, or Firm* — Studebaker & Brackett PC

(57) ABSTRACT

Provided is a flight device that can surely perform transformation operations of legs supporting a fuselage base in landing. A flight device 10 includes: a fuselage base 14; a first leg 26 provided on the fuselage base 14 and transformable between a flight state and a landing state; a second leg 27 provided on the fuselage base 14 as a separate body from the first leg 26 and transformable between the flight state and the landing state; a first drive unit 281 and a second drive unit 282 configured to drive transformation operations of the first leg 26 and the second leg 27; and an operation interconnecting mechanism 16 configured to interconnect the first leg 26 and the second leg 27 in terms of operation.

5 Claims, 11 Drawing Sheets

(58) Field of Classification Search
CPC ........ B64C 39/02; B64U 60/40; B64U 10/14; B64U 60/50
See application file for complete search history.

(56) References Cited

U.S. PATENT DOCUMENTS

| | | | | |
|---|---|---|---|---|
| 2,130,914 | A * | 9/1938 | Warren | B64C 25/34 244/104 R |
| 2,181,949 | A * | 12/1939 | Mercier | B64C 25/20 244/102 R |
| 3,029,047 | A * | 4/1962 | Jacobsen | B64C 1/063 244/17.11 |
| 9,878,257 | B2 * | 1/2018 | Barrett | B64C 29/02 |
| 9,902,493 | B2 * | 2/2018 | Simon | B64C 39/024 |
| 10,472,051 | B2 * | 11/2019 | High | B64U 60/50 |
| 10,710,708 | B2 * | 7/2020 | Zhao | B64C 25/00 |
| 11,427,309 | B2 * | 8/2022 | Cottet | B64C 25/34 |
| 2017/0129591 | A1 * | 5/2017 | High | B64U 60/50 |
| 2017/0253324 | A1 * | 9/2017 | Zhao | B64C 25/12 |
| 2018/0273158 | A1 * | 9/2018 | Courtin | B64C 39/024 |
| 2018/0370618 | A1 * | 12/2018 | Harris | B64C 25/22 |
| 2019/0144115 | A1 * | 5/2019 | Chen | B64C 39/024 244/118.1 |
| 2019/0291864 | A1 * | 9/2019 | Liu | G03B 15/006 |
| 2020/0039629 | A1 * | 2/2020 | Bosworth | B64C 39/008 |
| 2020/0223543 | A1 * | 7/2020 | Singh | H04B 7/18506 |
| 2022/0388635 | A1 * | 12/2022 | Ishikawa | B64C 39/024 |

FOREIGN PATENT DOCUMENTS

| | | |
|---|---|---|
| CN | 103754357 A | 4/2014 |
| CN | 103863559 A | 6/2014 |
| CN | 105517894 A | 4/2016 |
| CN | 205707304 U | 11/2016 |
| CN | 107444622 A | 12/2017 |
| CN | 108528679 A | 9/2018 |
| JP | 2017-506188 A | 3/2017 |
| JP | 2018-122674 A | 8/2018 |

OTHER PUBLICATIONS

Office Action mailed by China National Intellectual Property Administration on Oct. 13, 2023, which corresponds to Chinese Patent Application No. 202080019712.1 and is related to U.S. Appl. No. 17/755,898.

* cited by examiner

FLIGHT DEVICE

TECHNICAL FIELD

The present invention relates to a flight device and relates particularly to a flight device having foldable legs.

BACKGROUND ART

Unmanned flight devices capable of flying in the air have been conventionally known. Such a flight device can fly in the air by using propulsion of propellers that are rotationally driven about vertical axes.

For example, as application fields of the flight device, a field of transport, a field of surveying, a field of imaging, and the like are conceivable. When the flight device is applied to such fields, a surveying device or an imaging device is attached to the flight device. Applying the flight device to such fields can cause the flight device to fly into areas where human cannot enter and perform transporting, imaging, and surveying in these areas. An invention related to such a flight device is described in, for example, Patent Literature 1.

With reference to Patent Literature 1, multiple arms are provided on a fuselage, and a motor and a rotor blade are installed in an outer end portion of each arm. Moreover, forming a deploying-retracting mechanism in the fuselage allows the arms to be housed into and protrude from the fuselage. This deploying-retracting mechanism includes a link mechanism formed of a biasing member and a link piece turnable relative to the fuselage. Moreover, base ends of the respective arms are linked to the link mechanism.

CITATION LIST

Patent Literature

Patent Literature 1: Japanese Patent Application Publication No. 2018-122674

SUMMARY OF THE INVENTION

Problems to be Solved by the Invention

However, the aforementioned flight device described in Patent Literature 1 has a room of improvement in a structure of legs coming into contact with the ground in landing. Specifically, the legs provided in such a flight device is folded toward the fuselage side in flight and is unfolded to protrude toward the ground in landing. Moreover, two legs are provided as viewed from the front. However, since the two legs each independently perform a housing operation and an unfolding operation, there is a problem that synchronization of the operations of the respective legs is not necessarily easy.

Moreover, since the two legs each independently perform the housing operation and the unfolding operation, there is a problem that, if one of the legs fails in flight, this leg cannot be unfolded in landing and the flight device fails to land.

The present invention has been made in view of the aforementioned circumstances and an object thereof is to provide a flight device that can surely perform transformation operations of legs supporting a fuselage base in landing.

Means for Solving the Problem

A flight device of the present invention includes: a fuselage base; a first leg provided on the fuselage base and transformable between a flight state and a landing state; a second leg provided on the fuselage base as a separate body from the first leg and transformable between the flight state and the landing state; a drive unit configured to drive transformation operations of the first leg and the second leg; and an operation interconnecting mechanism configured to interconnect the first leg and the second leg in terms of operation.

In the flight device of the present invention, the drive unit includes a first drive unit configured to drive the transformation operation of the first leg and a second drive unit configured to drive the transformation operation of the second leg.

In the flight device of the present invention, the second leg is transformable between the flight state and the landing state by using drive force transmitted from the first drive unit via the operation interconnecting mechanism, and the first leg is transformable between the flight state and the landing state by using drive force transmitted from the second drive unit via the operation interconnecting mechanism.

In the flight device of the present invention, the first leg and the second leg are turnably attached to the fuselage base, and the first leg and the second leg transition to the flight state by turning to become closer to parallel to a bottom surface of the fuselage base, and transition to the landing state by turning to become closer to a standing state with respect to the bottom surface of the fuselage base.

In the flight device of the present invention, the drive unit further includes a leg link mechanism configured to turnably connect the first leg and the second leg to the fuselage base, a motor configured to cause the first leg and the second leg link mechanism to transform, and a magnet arranged in or near the first leg and the second leg link mechanism, and the magnet is arranged near a dead center in transformation of the first leg and the second leg from the flight state to the landing state.

In the flight device of the present invention, the drive unit is a motor arranged near a center portion of the fuselage base, and the operation interconnecting mechanism transmits power of the motor individually to each of the first leg and the second leg.

Effects of the Invention

A flight device of the present invention includes: a fuselage base; a first leg provided on the fuselage base and transformable between a flight state and a landing state; a second leg provided on the fuselage base as a separate body from the first leg and transformable between the flight state and the landing state; a drive unit configured to drive transformation operations of the first leg and the second leg; and an operation interconnecting mechanism configured to interconnect the first leg and the second leg in terms of operation. Thus, according to the flight device of the present invention, the first leg and the second leg can operate in synchronization by being interconnected with each other with the operation interconnecting mechanism in terms of operation. Specifically, the first leg and the second leg can operate in synchronization in both of transition from the flight state to the landing state and transition from the landing state and the flight state and the shapes of the first leg and the second leg in flight and landing can be set to predetermined shapes. Accordingly, in the landing of the flight device, it is possible to surely set the first leg and the second leg to the landing state and prevent a high-price imaging device attached below the fuselage base from breaking in landing.

In the flight device of the present invention, the drive unit includes a first drive unit configured to drive the transformation operation of the first leg and a second drive unit configured to drive the transformation operation of the second leg. Thus, according to the flight device of the present invention, even if one of the first drive unit and the second drive unit fails, the other drive unit that has not failed can drive the transformation operation of the other one of the first leg and the second leg via the operation interconnecting mechanism.

In the flight device of the present invention, the second leg is transformable between the flight state and the landing state by using drive force transmitted from the first drive unit via the operation interconnecting mechanism, and the first leg is transformable between the flight state and the landing state by using drive force transmitted from the second drive unit via the operation interconnecting mechanism. Thus, according to the flight device of the present invention, even if one of the first drive unit and the second drive unit fails, the first leg and the second leg can more surely transform.

In the flight device of the present invention, the first leg and the second leg are turnably attached to the fuselage base, and the first leg and the second leg transition to the flight state by turning to become closer to parallel to a bottom surface of the fuselage base, and transition to the landing state by turning to become closer to a standing state with respect to the bottom surface of the fuselage base. Thus, according to the flight device of the present invention, the states of the first leg and the second leg can be changed with a simple operation mechanism.

In the flight device of the present invention, the drive unit further includes a leg link mechanism configured to turnably connect the first leg to the fuselage base, a motor configured to cause the leg link mechanism to transform, and a magnet arranged in or near the leg link mechanism, and the magnet is arranged near a dead center in transformation of the first leg from the flight state to the landing state. Thus, according to the flight device of the present invention, arranging the magnet near the dead center allows the leg to surely transform from the flight state to the landing state.

In the flight device of the present invention, the drive unit is a motor arranged near a center portion of the fuselage base, and the operation interconnecting mechanism transmits power of the motor individually to each of the first leg and the second leg. Thus, according to the flight device of the present invention, opening and closing operations of the first leg and the second leg can be surely performed by using drive force of the motor.

BRIEF DESCRIPTION OF THE DRAWINGS

FIG. 4A is a side view illustrating an operation interconnecting mechanism and the like in the landing state, FIG. 4B is a side view illustrating the operation interconnecting mechanism in the flight state.

FIG. 5A is a perspective view of a leg link mechanism and the like in the landing state as viewed from the rear, and FIG. 5B is a perspective view of the leg link mechanism as viewed from the front.

FIG. 6A is an exploded perspective view of the leg link mechanism and the like in the landing state as viewed from the front, and FIG. 6B is an exploded perspective view of the leg link mechanism as viewed from the rear.

FIG. 7A is a perspective view of the leg link mechanism and the like in the flight state as viewed from the rear, and FIG. 7B is a perspective view of the leg link mechanism as viewed from the front.

FIG. 8A is a side view illustrating an operation of transformation of the first leg from the flight state to the landing state, FIG. 8B is a side view illustrating this situation in details.

FIG. 10A illustrates the landing state, FIG. 10B illustrates a transition state, and FIG. 10C illustrates the flight state.

FIG. 11A is a side view, and FIG. 11B is a perspective view.

MODES FOR CARRYING OUT THE INVENTION

Figure 1:
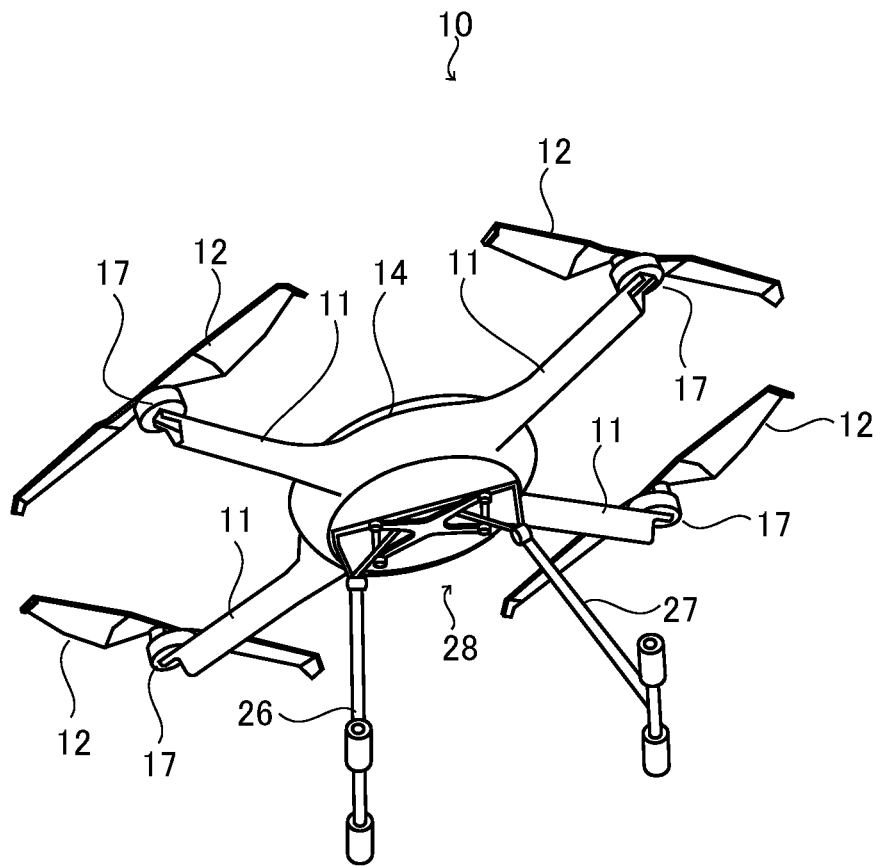
FIG. 1 is a perspective view illustrating a landing state of a flight device according an embodiment of the present invention.
Figure 1:
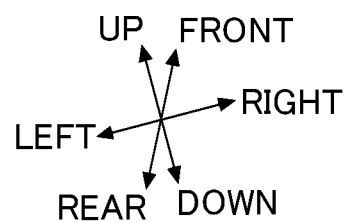

A flight device 10 according to an embodiment is described below with reference to the drawings. In the following description, the same members are denoted by the same reference numerals in principle and repeated explanation is omitted. Moreover, directions of up, down, front, rear, left, and right are used in the following description, and the left and right are left and right in the case where the flight device 10 is viewed from the front side in FIG. 1.

Figure 2:
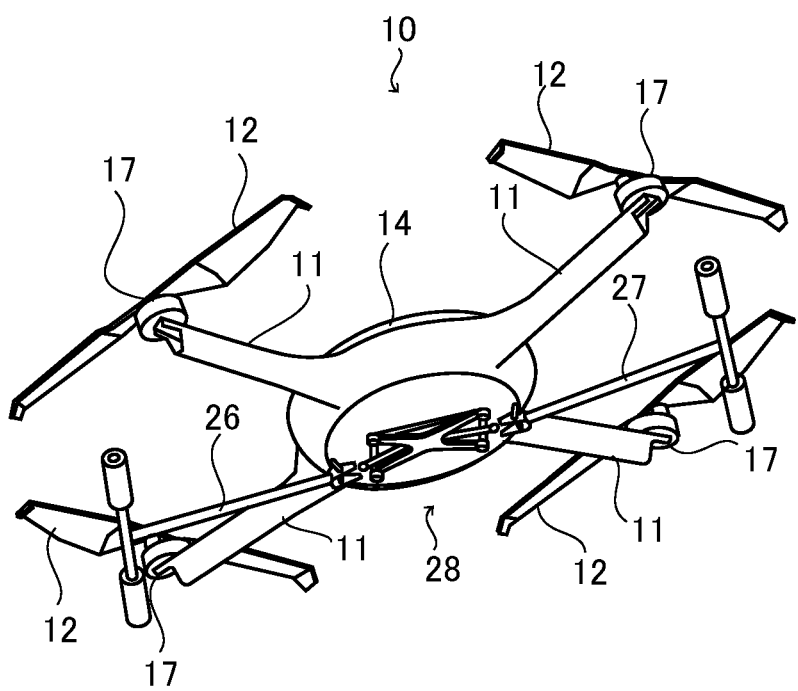
FIG. 2 is a perspective view illustrating a flight state of a flight device according the embodiment of the present invention.
Figure 2:
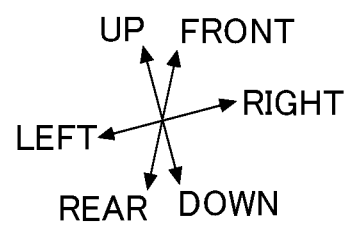

FIGS. 1 and 2 illustrate the entire flight device 10. FIG. 1 is a perspective view of the flight device 10 in a landing state as viewed from below. FIG. 2 is a perspective view of the flight device 10 in a flight state as viewed from below. In this example, the landing state is a state in which lower ends of a first leg 26 and a second leg 27 of the flight device 10 are in contact with the ground. Meanwhile, the flight state is a state in which the flight device 10 floats in the air and the first leg 26 and the second leg 27 are thereby out of contact with the ground.

With reference to FIG. 1, the flight device 10 mainly includes a fuselage base 14, arms 11 that extend from a peripheral portion of the fuselage base 14 toward an area surrounding the fuselage base 14, and propellers 12 arranged in outer end portions of the arms 11. The flight device 10 uses drive force generated by an engine or a motor mounted in the fuselage base 14 to rotate the propellers 12 at predetermined rotation speed and can fly and float in the air.

The fuselage base 14 is arranged at the center of the flight device 10 and the engine, a battery, a power generator, a control device, various sensors, a fuel tank, and the like that are not illustrated herein are housed in the fuselage base 14. An outer skin of the fuselage base 14 is covered with a synthetic resin plate or a steel plate formed in a predetermined shape.

The first leg 26 and the second leg 27 configured to come into contact with the ground in landing are arranged in a lower portion of the fuselage base 14. The first leg 26 and the second leg 27 are members also referred to as skids and the lower ends of the first leg 26 and the second leg 27 are in contact with the ground in a state where the flight device 10 has landed. Moreover, in the landing state, the first leg 26 and the second leg 27 are in a standing state with respect to a lower surface of the fuselage base 14. The first leg 26 and the second leg 27 are arranged to be foldable with respect to the fuselage base 14 and a drive unit 28 to be described later drives folding functions of the legs.

A mounted object such as an imaging camera not illustrated herein is installed below the fuselage base 14. In the landing state illustrated in FIG. 1, the aforementioned lower ends of the first leg 26 and the second leg 27 extend below a lower end of the mounted object. Such a design can prevent the mounted object from colliding with a landing surface such as the ground when the flight device 10 lands on the landing surface and prevent the mounted object such as a high-price camera from breaking with the landing of the flight device 10.

FIG. 2 is the perspective view in which the flight device 10 in the flight state is viewed from the lower rear side. In the flight state, the first leg 26 and the second leg 27 are turned to split in left and right directions. The first leg 26 and the second leg 27 are thereby substantially parallel to the lower surface of the fuselage base 14 or the axial directions of the arms 11. The camera as the mounted object not illustrated herein is attached below the fuselage base 14. The first leg 26 and the second leg 27 being in the flight state can prevent the first leg 26 and the second leg 27 from coming into the field of view of the camera and allows the camera to capture a video with higher quality.

As described later, the first leg 26 and the second leg 27 are attached to the lower surface of the fuselage base 14 to be transformable between the flight state and the landing state. Specifically, when the first leg 26 transforms from the landing state to the flight state, the first leg 26 turns clockwise as viewed from the rear with an upper end thereof being a fulcrum. Meanwhile, when the second leg 27 transforms from the landing state to the flight state, the second leg 27 turns counterclockwise as viewed from the rear with an upper end thereof being a fulcrum. Conversely, in transformation from the flight state to the landing state, the first leg 26 and the second leg 27 each turn in the opposite direction.

Figure 3:
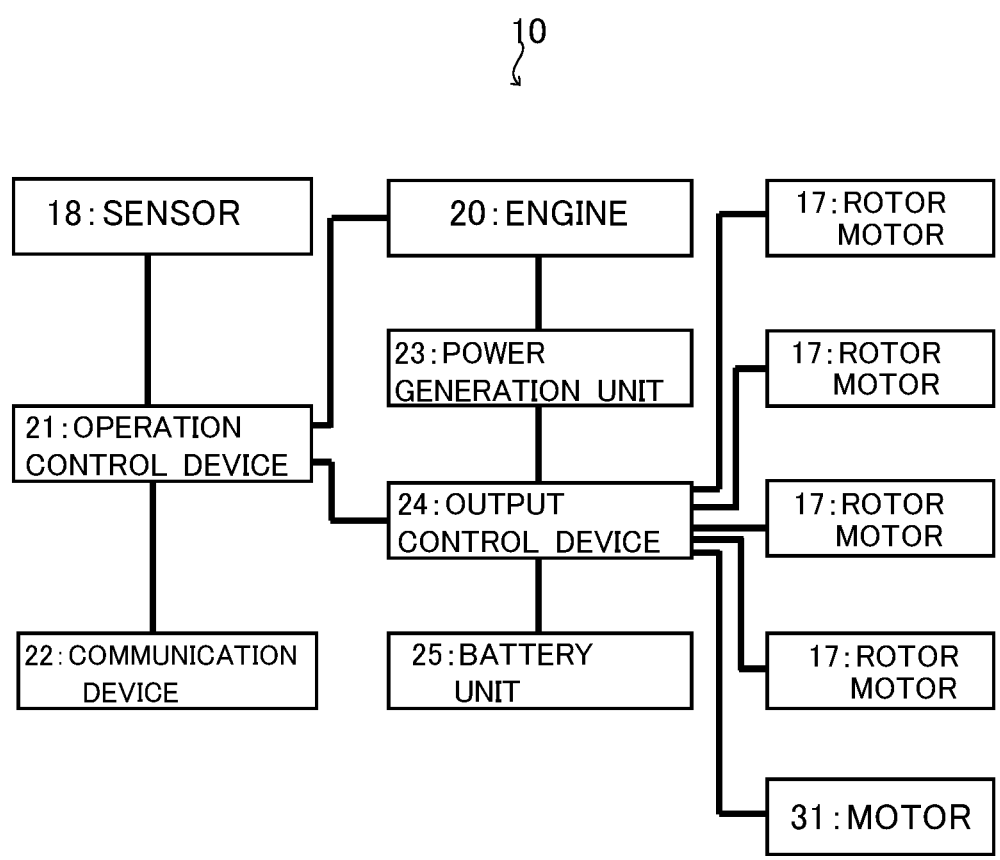
FIG. 3 is a block diagram illustrating a connection configuration of the flight device according to the embodiment of the present invention.

A connection configuration of the flight device 10 is described with reference to FIG. 3. The flight device 10 includes an operation control device 21, a sensor 18, a communication device 22, an engine 20, a power generation unit 23, a battery unit 25, an output control device 24, rotor motors 17, and the like.

This example illustrates a so-called series hybrid type flight device 10 in which the power generation unit 23 generates electric power by using drive force of the engine 20 and the motors are made to rotate by using the electric power generated by the power generation unit 23, thereby rotating the aforementioned propellers 12. However, a so-called parallel hybrid mechanism in which some of the propellers 12 are directly rotated by using the drive force of the engine 20 may also be employed. Furthermore, there may be employed an electric mechanism that includes no engine 20 and in which the rotor motors 17 are rotated by using only the electric power of the battery unit 25 that is a secondary cell.

The sensor 18 senses conditions of the flight device 10 itself and conditions around the flight device 10. Specifically, one or more of a gyroscope sensor that measures a tilt angle of the flight device 10, a compass that measures the heading of the flight device 10, a GPS (global positioning system) sensor that measures the position of the flight device 10, an atmospheric pressure sensor that measures the altitude of the flight device 10, and an acceleration sensor that measures the moving speed and the like of the flight device 10 are employed as the sensor 18. Information indicating physical amounts measured by the sensor 18 is transmitted to the operation control device 21.

The communication device 22 can exchange information with a not-illustrated ground communication device that an operator operating the flight device 10 on the ground has. The operator can control the altitude, proceeding direction, moving speed, and the like of the flight device 10 by operating the ground communication device. Moreover, the operator can obtain measurement data and video data obtained in the flight device 10 by receiving information outputted from the communication device 22 with the not-illustrated ground communication device.

The operation control device 21 includes a computation device formed of a CPU (central processing unit) and a storage device formed of a RAM (random access memory) and a ROM (read only memory) and controls operations of the entire flight device 10.

The operation control device 21 controls the drive operation of the engine 20 and electric power generated by the power generation unit 23 connected to the engine 20 to be driven is supplied to the output control device 24.

The output control device 24 includes a power converter circuit and the like and converts the electric power supplied from the power generation unit 23 to electric power suitable for flight of the flight device 10 to then supply the electric power to the rotor motors 17. In the case of changing the attitude of the flight device 10 in midair, the output control device 24 changes the electric power supplied to each of the rotor motors 17 and the like based on an instruction of the operation control device 21. The configuration may be such that the electric power supplied from the power generation unit 23 to the output control device 24 is partially used to charge the battery unit 25 that is a rechargeable battery and the electric power supplied from the battery unit 25 is used to rotate the rotor motors 17 and the like.

Figure 4A:
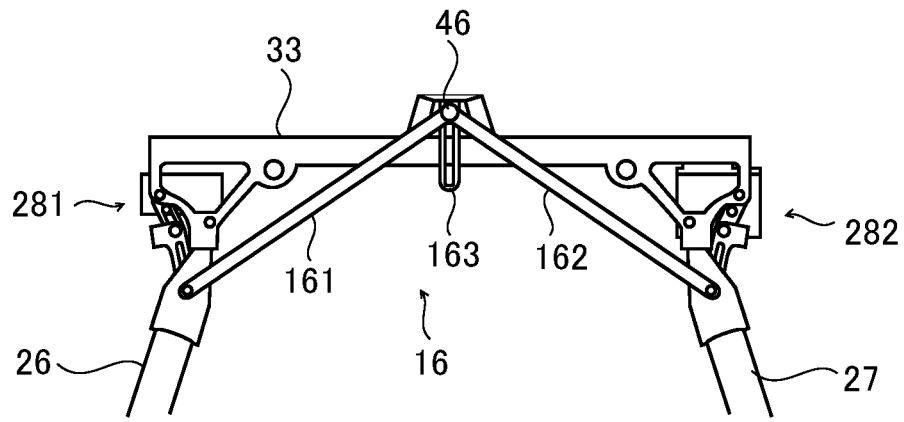
FIGS. 4A and 4B are views illustrating the flight device according to an embodiment of the present invention.
Figure 4A:
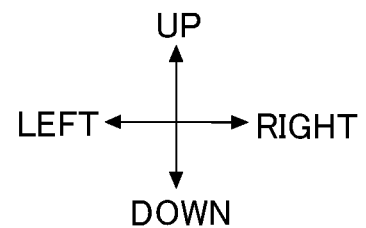
Figure 4B:
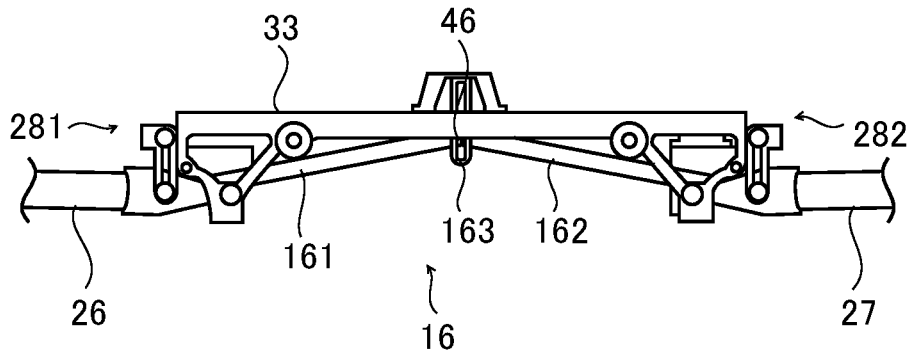
Figure 4B:
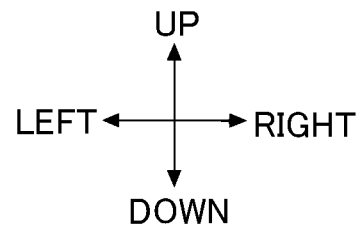

An operation interconnecting mechanism 16 that drives turning operations of the first leg 26 and the second leg 27 is described with reference to FIGS. 4A and 4B. FIG. 4A is a side view illustrating a state of the operation interconnecting mechanism 16 in the landing state. FIG. 4B is a side view illustrating a state of the operation interconnecting mechanism 16 in the flight state.

With reference to FIG. 4A, an attachment frame 33 is a plate-shaped member attached to the lower surface of the fuselage base 14 illustrated in FIG. 1 and the like. A first drive unit 281, a second drive unit 282, and the operation interconnecting mechanism 16 described below are arranged between the attachment frame 33 and a set of the first leg 26 and the second leg 27.

The first leg 26 is turnably attached to the attachment frame 33 via the first drive unit 281. The first drive unit 281 rotates the first leg 26 clockwise in transition from the landing state to the flight state, and rotates the first leg 26 counterclockwise in transition from the flight state to the landing state. The first leg 26 is described later with reference to FIGS. 5A and 5B and the like.

The second leg 27 is turnably attached to the attachment frame 33 via the second drive unit 282. The second drive unit 282 rotates the second leg 27 counterclockwise in transition from the landing state to the flight state, and rotates the second leg 27 clockwise in transition from the flight state to the landing state. A configuration of the second leg 27 is the same as the first leg 26.

The operation interconnecting mechanism 16 is a mechanism that synchronizes the operation of the first drive unit 281 and the operation of the second drive unit 282 with each other and is formed of a first operation interconnecting mechanism part 161, a second operation interconnecting mechanism part 162, and a third operation interconnecting mechanism part 163. In the transition from the landing state to the flight state and the transition from the flight state to the landing state, the operation interconnecting mechanism 16 turns the first drive unit 281 and the second drive unit 282 in synchronization.

The first operation interconnecting mechanism part 161 is a substantially bar-shaped member made of a metal or the like. A left end portion is turnably connected to the first leg 26 and a right end portion is turnably connected to the second operation interconnecting mechanism part 162.

The second operation interconnecting mechanism part 162 is a substantially bar-shaped member made of a metal or the like. A right end portion is turnably connected to the second leg 27 and a left end portion is turnably connected to the first operation interconnecting mechanism part 161. The first operation interconnecting mechanism part 161 and the second operation interconnecting mechanism part 162 are turnably connected to each other at a joint 46.

The third operation interconnecting mechanism part 163 is arranged in a center portion of the attachment frame 33 in the left-right direction and is a rail-shaped member formed to elongate in the up-down direction. In the aforementioned transformation of the first leg 26 and the second leg 27 transform, the joint 46 slides in the up-down direction in the third operation interconnecting mechanism part 163.

The operation interconnecting mechanism 16 with the aforementioned configuration causes the first drive unit 281 and the second drive unit 282 to perform rotational drive in synchronization. Accordingly, the transformation from the flight state to the landing state and the transformation from the landing state to the flight state of the first leg 26 and the second leg 27 can be synchronized and the turning angles of the first leg 26 and the second leg 27 can be equalized. Thus, it is possible to stabilize the angles of the first leg 26 and the second leg 27 in the flight state and the landing state and stably support the fuselage base 14 with the first leg 26 and the second leg 27 particularly in landing.

In the transformation from the landing state illustrated in FIG. 4A to the flight state illustrated in FIG. 4B, the first drive unit 281 turns the first leg 26 clockwise. Moreover, the second drive unit 282 turns the second leg 27 counterclockwise. In this case, the first leg 26 pulls the first operation interconnecting mechanism part 161 toward the left side that is the outer side and the second leg 27 pulls the second operation interconnecting mechanism part 162 toward the right side that is the outer side. Simultaneously, the joint 46 slides downward in the third operation interconnecting mechanism part 163. As a result, the operations of the members forming the operation interconnecting mechanism 16 can cause the first leg 26 and the second leg 27 to transform from the landing state to the flight state at similar timings.

Conversely, in the transformation from the flight state illustrated in FIG. 4B to the landing state illustrated in FIG. 4A, the first drive unit 281 turns the first leg 26 counterclockwise. Moreover, the second drive unit 282 turns the second leg 27 clockwise. In this case, the first leg 26 pulls the first operation interconnecting mechanism part 161 toward the right side that is the inner side and the second leg 27 pulls the second operation interconnecting mechanism part 162 toward the left side that is the inner side. Simultaneously, the joint 46 slides upward in the third operation interconnecting mechanism part 163. The operations of the members forming the operation interconnecting mechanism 16 can cause the first leg 26 and the second leg 27 to transform from the flight state to the landing state at similar timings.

Furthermore, the operation interconnecting mechanism 16 has a redundancy function of mutually transmitting drive force between the first leg 26 and the second leg 27. Specifically, drive force generated from the second drive unit 282 is transmitted to the first leg 26 via the operation interconnecting mechanism 16. Moreover, drive force generated from the first drive unit 281 is transmitted to the second leg 27 via the operation interconnecting mechanism 16. Thus, even when one of the first drive unit 281 and the second drive unit 282 becomes inoperative, the drive force of the other one of the first drive unit 281 and the second drive unit 282 can be used to perform the transformation operations of both of the first leg 26 and the second leg 27.

For example, assume a case where the first drive unit 281 fails in the transition from the flight state illustrated in FIG. 4B to the landing state illustrated in FIG. 4A. If there is no operation interconnecting mechanism 16, only the second leg 27 transitions to the landing state illustrated in FIG. 4A and the first leg 26 remains in the flight state illustrated in FIG. 4B. In this case, the flight device 10 illustrated in FIG. 1 and the like cannot normally land and the high-price camera attached below the fuselage base 14 may collide with the ground and break.

In the embodiment, the operation interconnecting mechanism 16 mutually transmits the drive force between the second leg 27 and the first leg 26. Accordingly, even if the first drive unit 281 fails, the drive force of the second drive unit 282 is transmitted to the first leg 26 side via the operation interconnecting mechanism 16. Specifically, when the second drive unit 282 turns the second leg 27 clockwise, the second leg 27 pushes the second operation interconnecting mechanism part 162 toward the inner side, that is the left side. Simultaneously, the joint 46 slides upward in the third operation interconnecting mechanism part 163 and the first operation interconnecting mechanism part 161 is pulled toward the inner side, that is the right side. As a result, the first leg 26 can transform from the flight state to the landing state even in a situation where the first drive unit 281 has failed and does not provide drive force.

Figure 5A:
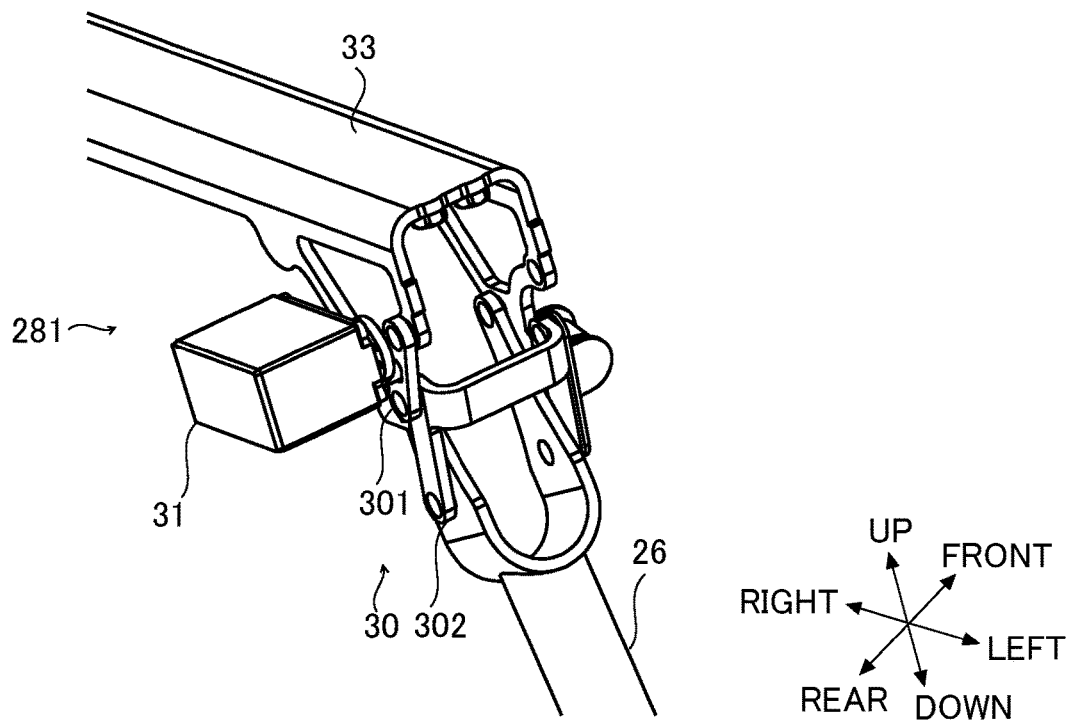
FIGS. 5A and 5B are views illustrating the flight device according to the embodiment of the present invention.
Figure 5B:
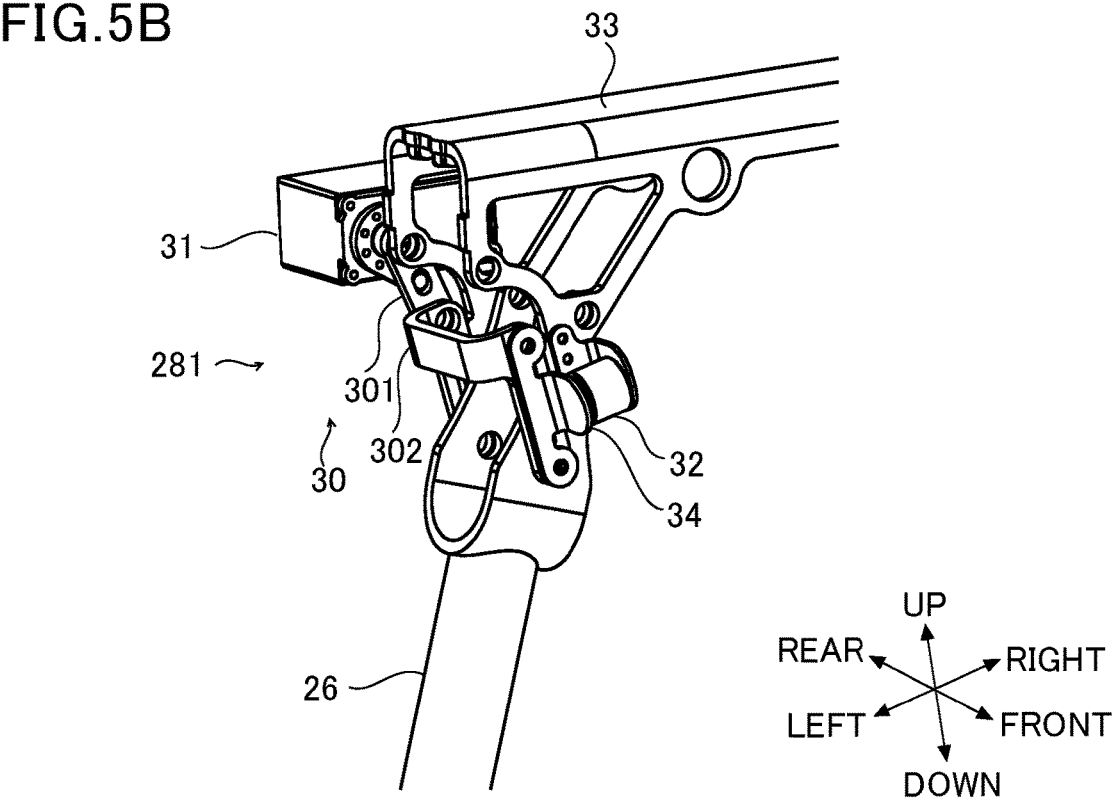
Figure 6A:
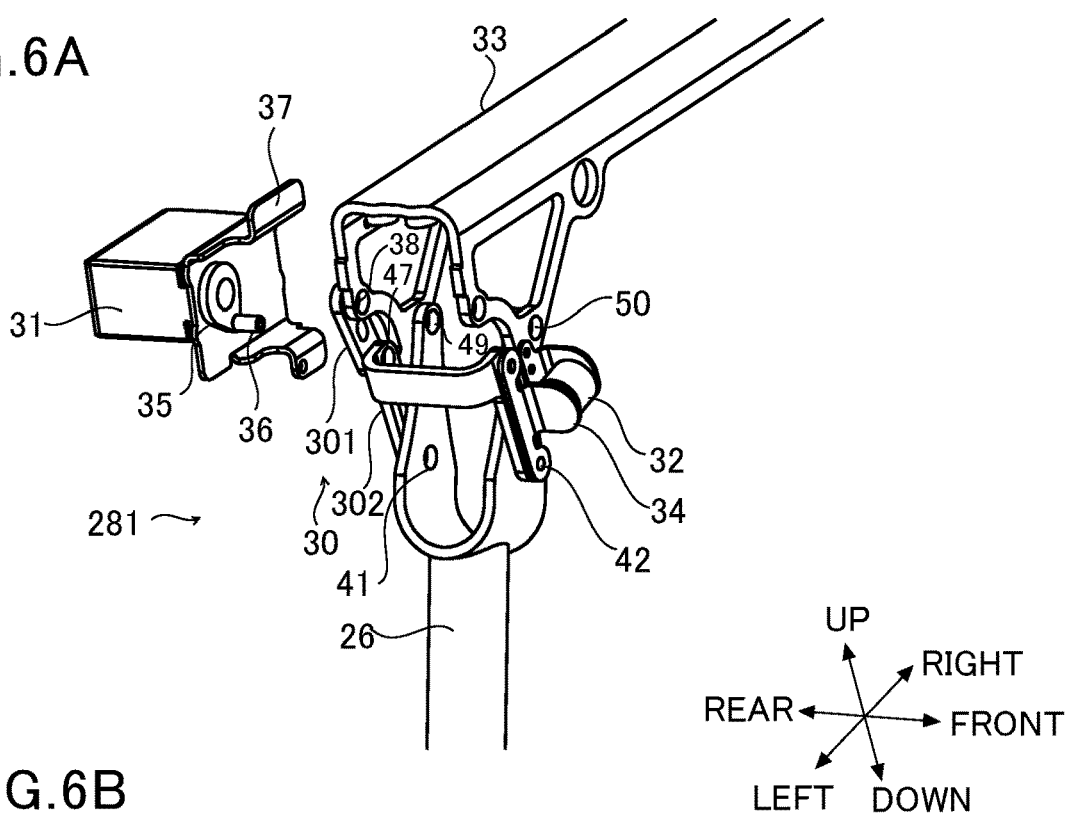
FIGS. 6A and 6B are views illustrating the flight device according to the embodiment of the present invention.
Figure 6B:
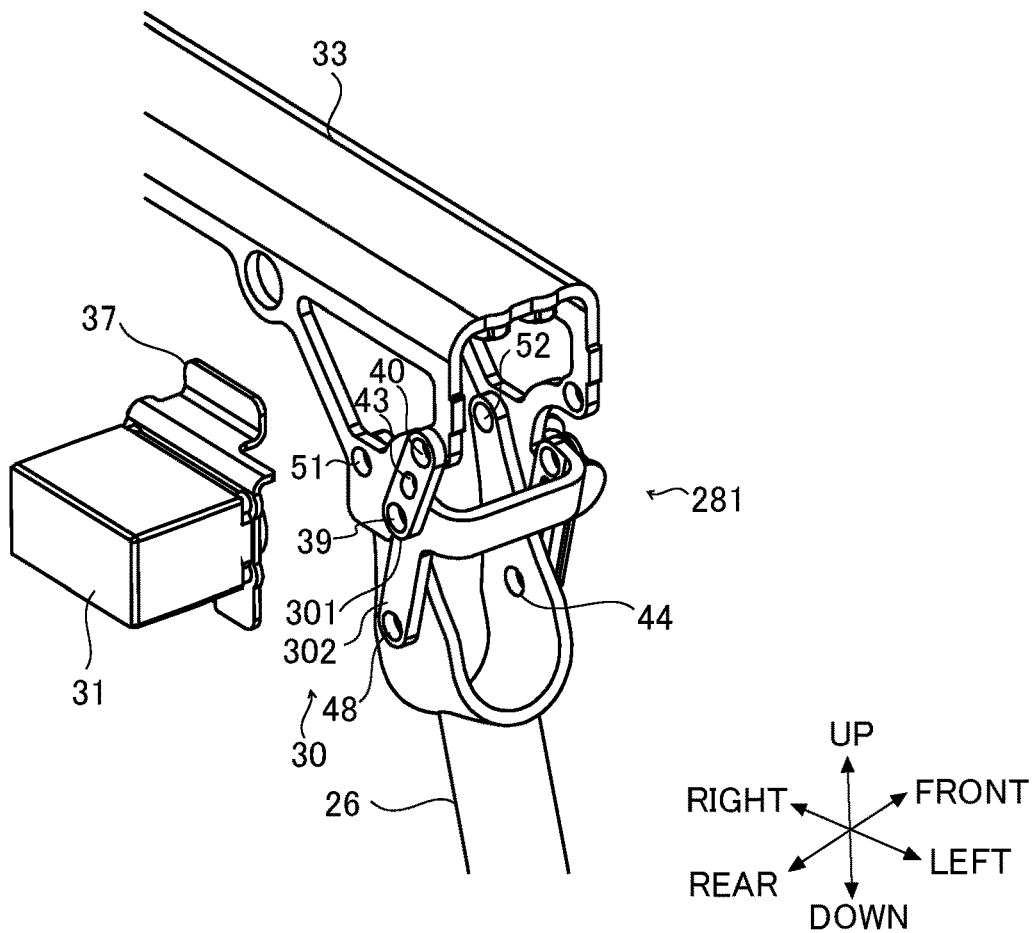

The configuration of the first drive unit 281 is described in detail with reference to FIGS. 5A to 7B. FIG. 5A is a perspective view in which the first drive unit 281 in the landing state is viewed from the rear and FIG. 5B is a perspective view in which the first drive unit 281 is viewed from the front. FIG. 6A is an exploded perspective view in which the first drive unit 281 in a state where a motor 31 is separated from the attachment frame 33 is viewed from the front and FIG. 6B is an exploded perspective view in which the first drive unit 281 in this state is viewed from the rear.

Figure 7A:
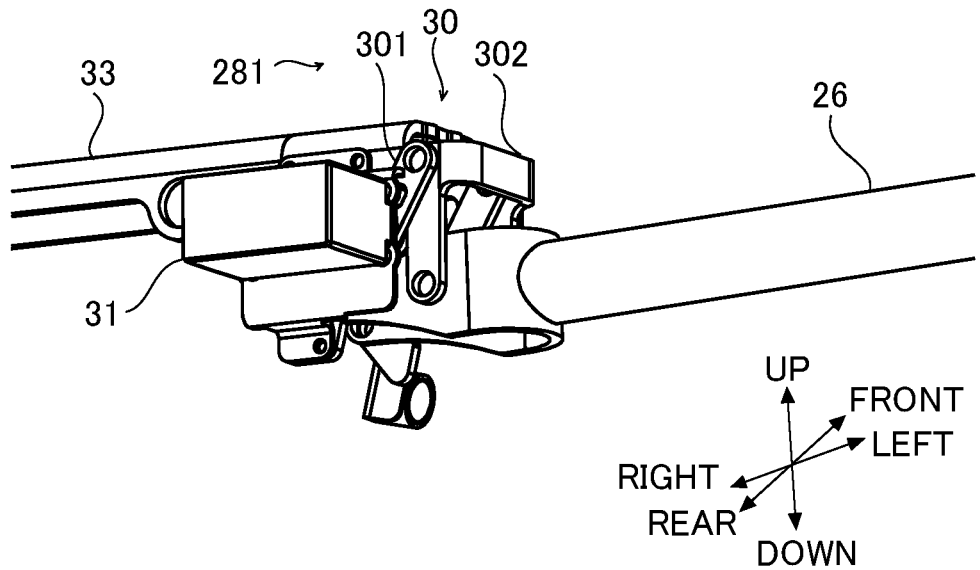
FIGS. 7A and 7B are views illustrating the flight device according to the embodiment of the present invention.
Figure 7B:
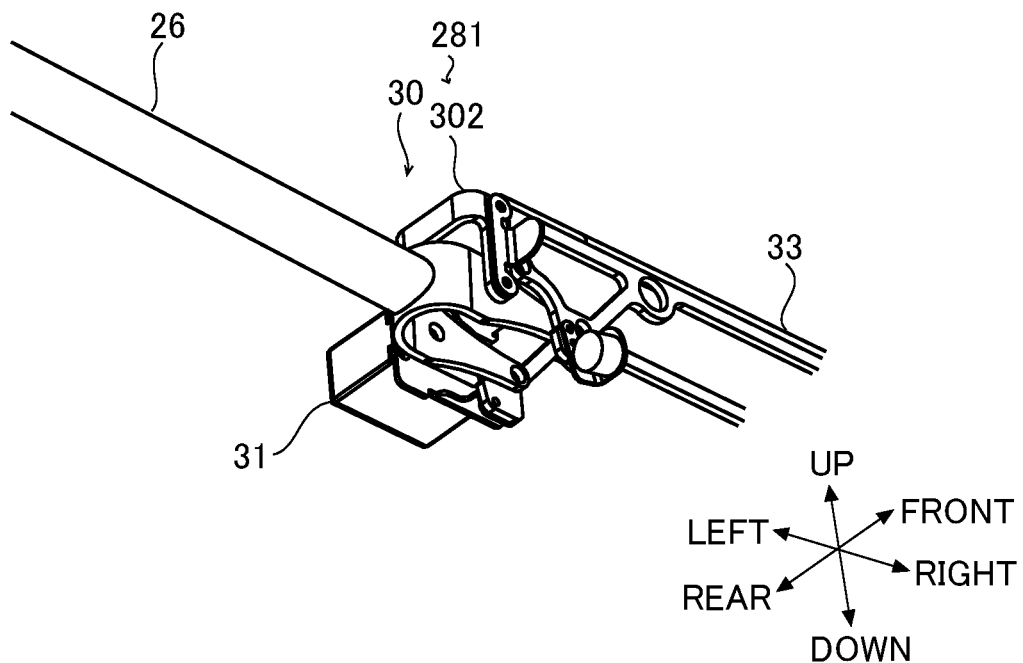

FIG. 7A is a perspective view in which the first drive unit 281 in the flight state is viewed from the rear and FIG. 7B is a perspective view in which the first drive unit 281 is viewed from the front. Note that the configuration of the second drive unit 282 is similar to that of the first drive unit 281.

With reference to FIGS. 5A and 5B, the first drive unit 281 mainly includes the motor 31, a first leg link part 301, a second leg link part 302, and a magnet 32.

With reference to FIG. 5A, the first leg link part 301 is a substantially plate-shaped member. The upper end side of the first leg link part 301 is rotatably connected to the attachment frame 33 and the lower end side thereof is rotatably connected to the second leg link part 302. Moreover, a drive portion of the motor 31 is inserted into an intermediate portion of the first leg link part 301 as described later.

The second leg link part 302 is a member formed of a metal plate bent and processed to have a substantially U shape that is open on the lower side as viewed from the left. Both lower end portions of the second leg link part 302 are rotatably connected to the first leg 26. Moreover, a lower end of the first leg link part 301 is rotatably connected to an upper end portion of the second leg link part 302 on the rear face side.

With reference to FIG. 5B, a front face of the second leg link part 302 is partially formed in a tongue shape to form an attracted portion 34. The attracted portion 34 is made of a magnetic material such as iron. The magnet 32 is arranged near the attracted portion 34. The magnet 32 is fixed to the attachment frame 33. In the landing state illustrated in FIG. 5B, a right side surface of the attracted portion 34 and a left side surface of the magnet 32 are in contact with or very close to each other. Such a configuration allows a joint forming a leg link mechanism 30 to get over a dead center 29 and be attracted toward the right side that is the inner side as described later and the angle of the first leg 26 can be stabilized.

With reference to FIG. 6A, the motor 31 is fixedly attached to a side surface of the attachment frame 33 via an attachment member 37 that is a metal plate. Moreover, a rotation member 35 and a protrusion-shaped portion 36 are connected to a rotor of the motor 31. The rotation member 35 is a substantially circular plate member and the protrusion-shaped portion 36 protruding forward is attached to an outer portion of the rotation member 35 in the radial direction. The protrusion-shaped portion 36 is inserted into an insertion hole 43 of the first leg link part 301 to be described later.

Moreover, a link hole 42 (FIG. 6A) and a link hole 48 (FIG. 6B) are formed on the lower end side of the second leg link part 302. Furthermore, a link hole 47 (FIG. 6A) is formed on a rear side surface of the second leg link part 302. With reference to FIG. 6B, a link hole 40, the insertion hole 43, and a link hole 39 are formed in the first leg link part 301 in this order from the top. Moreover, in plate-shaped members in an upper end portion of the first leg 26, a link hole 44 (FIG. 6B) is formed on the front side and a link hole 41 (FIG. 6A) is formed on the rear side.

A not-illustrated rotating shaft is inserted into the link hole 40 (FIG. 6B) of the first leg link part 301 and a link hole 38 of the attachment frame 33 illustrated in FIG. 6A. The link hole 40 and the link hole 38 are thereby link-connected. Moreover, the aforementioned protrusion-shaped portion 36 (FIG. 6A) of the motor 31 is inserted into the insertion hole 43 (FIG. 6B) of the first leg link part 301. Furthermore, the link hole 39 (FIG. 6B) of the first leg link part 301 and the link hole 47 (FIG. 6A) of the second leg link part 302 are link-connected.

The link hole 48 (FIG. 6B) of the second leg link part 302 and the link hole 41 (FIG. 6A) of the first leg 26 are link-connected. Moreover, the link hole 42 (FIG. 6A) of the second leg link part 302 and the link hole 44 (FIG. 6B) of the first leg 26 are link-connected.

Furthermore, a link hole 49 (FIG. 6A) of the first leg 26 and a link hole 51 (FIG. 6B) of the attachment frame 33 are link-connected. Moreover, a link hole 52 (FIG. 6B) of the first leg 26 and a link hole 50 (FIG. 6A) of the attachment frame 33 are link-connected.

Configuring the first drive unit 281 as described above allows the first leg 26 to easily transform from the landing state to the flight state. Specifically, with reference to FIG. 6A, when the motor 31 rotates the rotation member 35 clockwise as viewed from the front according to an instruction of the operation control device 21 (FIG. 3), the protrusion-shaped portion 36 arranged in a peripheral portion of the rotation member 35 also similarly rotates clockwise. With this rotation, with reference to FIG. 6B, the first leg link part 301 rotates counterclockwise as viewed from the rear about the link hole 40. In such a case, the second leg link part 302 moves upward with the posture thereof substantially maintained as it is. Simultaneously, the first leg 26 turns counterclockwise as viewed from the rear about the link hole 49 (FIG. 6A) and the link hole 52 (FIG. 6B). The motor 31 rotates the rotation member 35 until the axial direction of the first leg 26 becomes substantially parallel to the lower surface of the fuselage base 14 illustrated in FIG. 1 or until the first leg 26 moves out from the field of view of the imaging camera attached below the fuselage base 14. When the first leg 26 reaches a certain angle, the motor 31 stops.

FIGS. 7A and 7B illustrate the shapes of the first leg 26 and the like in the flight state. In the flight state, the axial direction of the first leg 26 and a main surface of the attachment frame 33 are substantially parallel to each other.

Moreover, in the transformation of the first leg 26 from the flight state to the landing state, a process opposite to that described above is executed. Specifically, the motor 31 illustrated in FIG. 6A is made to rotate counterclockwise as viewed from the front to thereby rotate the first leg link part 301 illustrated in FIG. 6B clockwise as viewed from the rear. With this rotation, with reference to FIG. 6B, the second leg link part 302 moves downward with the posture thereof substantially maintained and the first leg 26 rotates clockwise as viewed from the rear. When the first leg 26 reaches a certain angle, the motor 31 stops and the landing state as illustrated in FIG. 1 is achieved.

In this case, the second leg 27 can also transform between the landing state and the flight state as described above. Moreover, the transformation operation of the first leg 26 and the transformation operation of the second leg 27 are executed simultaneously.

Figure 8A:
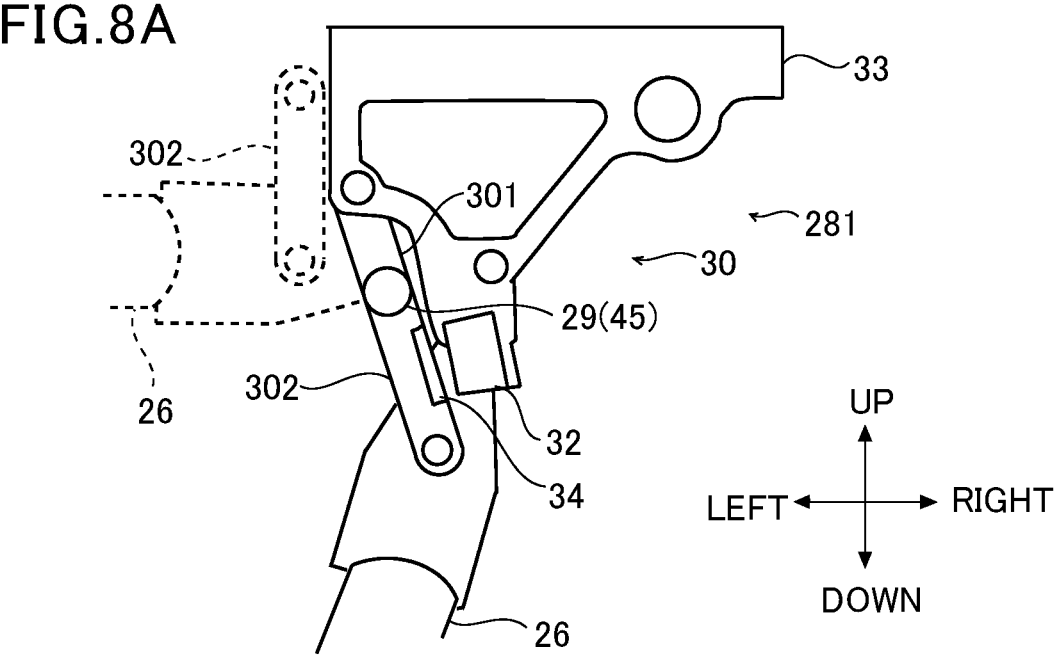
FIGS. 8A and 8B are views illustrating the flight device according to the embodiment of the present invention.

A function of the magnet 32 is described with reference to FIGS. 8A and 8B. FIG. 8A is a side view illustrating the first drive unit 281 and FIG. 8B is a side view illustrating an action of the magnet 32.

Figure 8B:
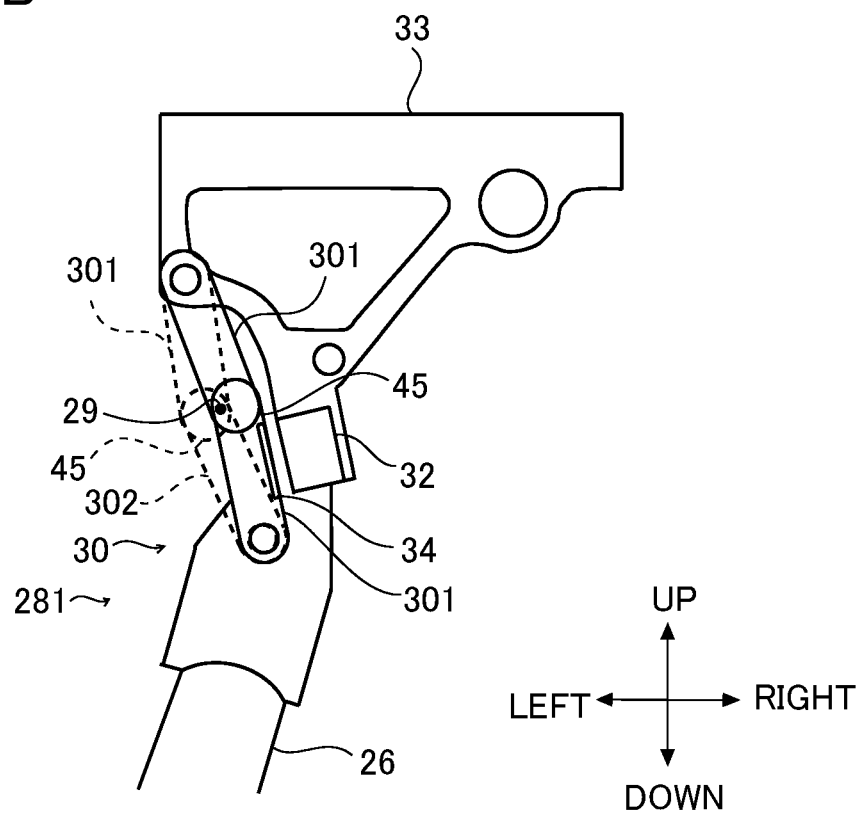

As described above, the first drive unit 281 includes the leg link mechanism 30, the motor 31 not illustrated in FIGS. 8A and 8B, and the magnet 32. The first drive unit 281 causes the leg link mechanism 30 to transform by using the drive force of the motor 31 and thereby causes the first leg 26 to transform between the flight state and the landing state.

There may be a case where the drive force of the motor 31 alone is not necessarily enough for the transformation of the leg link mechanism 30. Specifically, with reference to FIG. 8A, assuming that a portion where the first leg link part 301 and the second leg link part 302 are turnably connected is referred to as a link joint 45, when the first leg 26 is transformed from the flight state to the landing state by the displacement of the leg link mechanism 30, the first leg link part 301 and the second leg link part 302 are temporarily arranged in a straight line. The position of the link joint 45 in this case is at the dead center 29. In this description, the dead center 29 is sometimes also referred to as dead point.

Assume a case where the transformation of the leg link mechanism 30 stops in the state where the link joint 45 overlaps the dead center 29. If the flight device 10 lands in this state, the first leg 26 bends outward and the camera attached below the flight device 10 may collide with the landing surface and break.

Particularly, when the first drive unit 281 fails and the drive force of the second drive unit 282 is thus transmitted through the operation interconnecting mechanism 16 to transform the first leg 26 from the flight state to the landing state as described with reference to FIGS. 4A and 4B, torque for transforming the leg link mechanism 30 of the first drive unit 281 is small and a problem of the link joint 45 not getting over the dead center 29 becomes apparent.

In the embodiment, the magnet 32 is arranged on the attachment frame 33 side to cause the link joint 45 to get over the dead center 29 and move rightward. Moreover, the attracted portion 34 that is a magnetic body is arranged in the second leg link part 302 that comes close to the magnet 32. As illustrated in FIG. 8B, this causes the magnet 32 to attract the attracted portion 34 and the link joint 45 is thereby pulled rightward and gets over the dead center 29 even when supply of the drive to the first drive unit 281 stops in a situation where the link joint 45 has reached a point near the dead center 29. Thus, the leg link mechanism 30 is set to a state where it can firmly support the first leg 26, and the first leg 26 does not unintentionally collapse toward the left side that is the outer side even if stress acts on the first leg 26 due to landing of the flight device 10.

The matters described with reference to FIGS. 8A and 8B apply also to the second drive unit 282 that supports the second leg 27 illustrated in FIG. 2. The second leg 27 can be thereby transformed from the flight state to the landing state by using drive force transmitted from the first drive unit 281 via the operation interconnecting mechanism 16 even when the second drive unit 282 fails during flight of the flight device 10.

Figure 9:
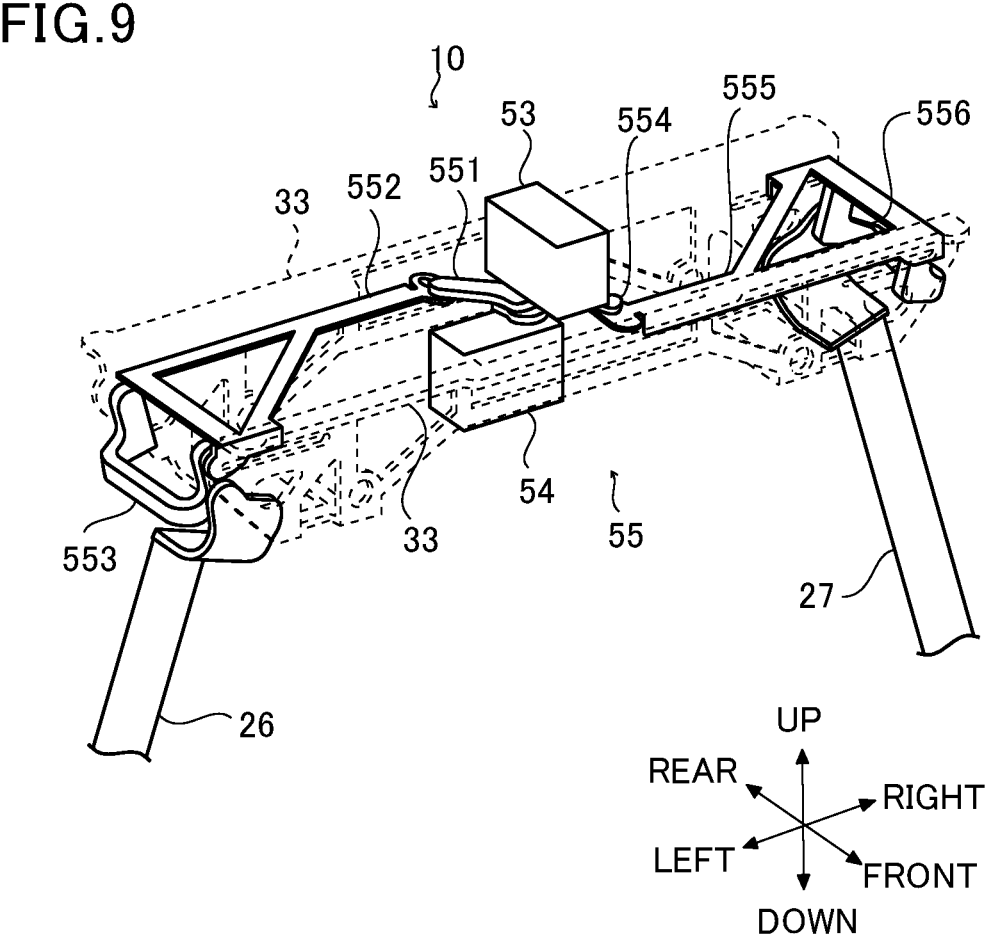
FIG. 9 is a perspective view illustrating a portion of a flight device according to another embodiment of the present invention.

FIG. 9 is a perspective view illustrating a portion of a flight device 10 according to another embodiment.

The basic configuration of the flight device 10 illustrated in FIG. 9 is the same as that illustrated in FIG. 1 and a configuration of an operation interconnecting mechanism 55 is different. In this embodiment, the operation interconnecting mechanism 55 including a motor 53 and the like is attached to the attachment frame 33.

The operation interconnecting mechanism 55 is formed of the motor 53, a motor 54, and a first operation interconnecting mechanism part 551 to a sixth operation interconnecting mechanism part 556. In this example, the first operation interconnecting mechanism part 551 to the third operation interconnecting mechanism part 553 are a link mechanism that drives opening and closing operations of the first leg 26 and the fourth operation interconnecting mechanism part 554 to the sixth operation interconnecting mechanism part 556 are another link mechanism that drives opening and closing operations of the second leg 27.

A rotating shaft of the motor 53 that is not illustrated herein is connected to a right end portion of the first operation interconnecting mechanism part 551 and a left end portion of the fourth operation interconnecting mechanism part 554 from above to be non-rotatable relative to these portions. A rotating shaft of the motor 54 that is not illustrated herein is connected to the right end portion of the first operation interconnecting mechanism part 551 and the left end portion of the fourth operation interconnecting mechanism part 554 from below to be non-rotatable relative to these portions. Including the motor 53 and the motor 54 allows such an operation that, even when one of the motors fails, drive force of the other one of the motors that has not failed can rotationally drive the first operation interconnecting mechanism part 551 and the fourth operation interconnecting mechanism part 554.

The first operation interconnecting mechanism part 551 is a member that is arranged near a center portion of the attachment frame 33 in the left-right direction and that is made of a rotatably-arranged metal plate or the like.

The second operation interconnecting mechanism part 552 is a member that is arranged on the left side of the attachment frame 33 and that is made of a metal plate or the like arranged to be slidable in the left-right direction relative to the attachment frame 33. A right end portion of the second operation interconnecting mechanism part 552 is turnably connected to a left end portion of the first operation interconnecting mechanism part 551. Moreover, a left end portion of the second operation interconnecting mechanism part 552 is turnably connected to an upper end portion of the third operation interconnecting mechanism part 553.

The third operation interconnecting mechanism part 553 is a member arranged on the left end side of the attachment frame 33. The upper end side of the third operation interconnecting mechanism part 553 is turnably connected to the left end portion of the second operation interconnecting mechanism part 552 and the lower end side thereof is turnably connected to the upper end portion of the first leg 26.

The fourth operation interconnecting mechanism part 554 is a member that is arranged near the center portion of the attachment frame 33 in the left-right direction and that is made of a rotatably-arranged metal plate or the like.

The fifth operation interconnecting mechanism part 555 is a member that is arranged on the right side of the attachment frame 33 and that is made of a metal plate or the like arranged to be slidable in the left-right direction relative to the attachment frame 33. A left end portion of the fifth operation interconnecting mechanism part 555 is turnably connected to a right end portion of the fourth operation interconnecting mechanism part 554. Moreover, a right end portion of the fifth operation interconnecting mechanism part 555 is turnably connected to an upper end portion of the sixth operation interconnecting mechanism part 556.

The sixth operation interconnecting mechanism part 556 is a member arranged on the right end side of the attachment frame 33. The upper end side of the sixth operation interconnecting mechanism part 556 is turnably connected to the right end portion of the fifth operation interconnecting mechanism part 555 and the lower end side thereof is turnably connected to the upper end portion of the second leg 27.

Figure 10A:
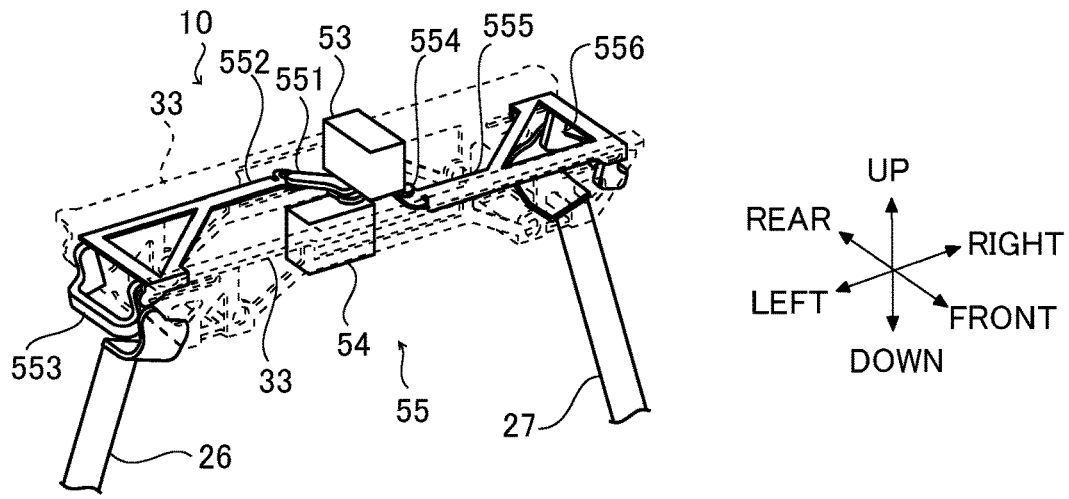
FIGS. 10A to 10C are perspective views illustrating a portion of the flight device according to the other embodiment of the present invention.
Figure 10B:
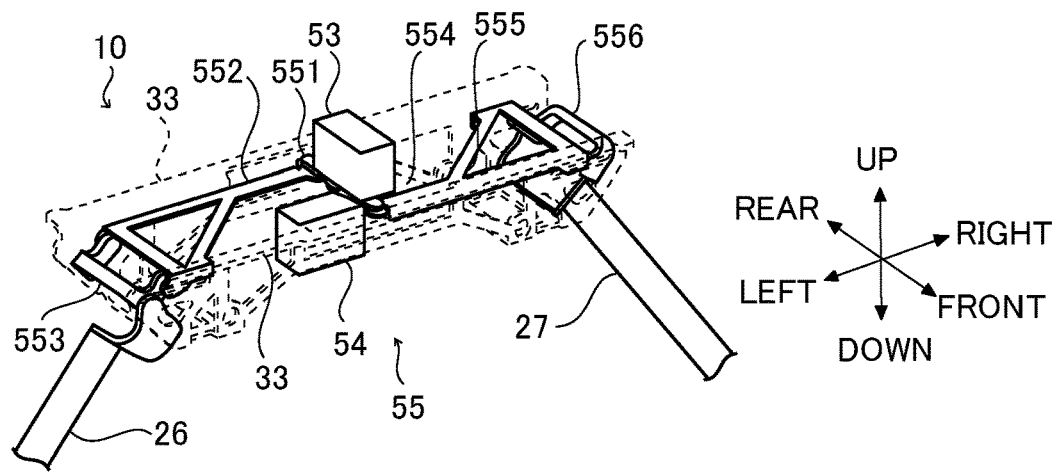
Figure 10C:
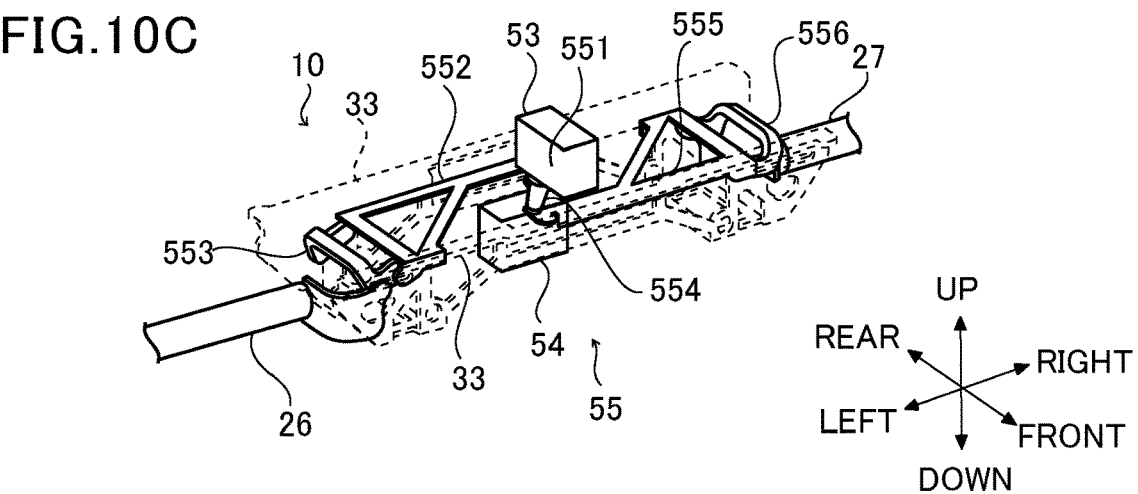

FIGS. 10A to 10C are perspective views illustrating a portion of the flight device 10 according to the other embodiment, FIG. 10A illustrates the landing state, FIG.

10B illustrates a transition state, and FIG. 10C illustrates the flight state. In this description, the transition state is a state in transition from the landing state to the flight state or transition from the flight state to the landing state.

With reference to FIG. 10A, when the flight device 10 is to be set to the landing state, the rotating shafts of the motor 53 and the motor 54 that are not illustrated herein are made to rotate counterclockwise as viewed from above to rotate the first operation interconnecting mechanism part 551 and the fourth operation interconnecting mechanism part 554 counterclockwise.

The first operation interconnecting mechanism part 551 is in a state where it is rotated counterclockwise about the right end portion thereof. The second operation interconnecting mechanism part 552 is thereby in a state where it is made to slide leftward. Moreover, the third operation interconnecting mechanism part 553 is in a state where it is rotated counterclockwise as viewed from the front and is moved leftward. The first leg 26 is thereby in a state where it is rotated counterclockwise about the upper end portion thereof as viewed from the front, that is in the landing state where it extends downward.

Meanwhile, the fourth operation interconnecting mechanism part 554 is in a state where it is rotated counterclockwise about the left end portion thereof. The second operation interconnecting mechanism part 552 is thereby in a state where it is made to slide rightward. Moreover, the sixth operation interconnecting mechanism part 556 is in a state where it is rotated clockwise as viewed from the front and is moved rightward. Furthermore, the second leg 27 is in a state where it is rotated clockwise about the upper end portion thereof as viewed from the front, that is in the landing state where it extends downward.

With reference to FIG. 10B, when the flight device 10 is to be transitioned from the landing state to the transition state, the rotating shafts of the motor 53 and the motor 54 that are not illustrated herein are made to rotate clockwise as viewed from above to rotate the first operation interconnecting mechanism part 551 and the fourth operation interconnecting mechanism part 554 clockwise.

The first operation interconnecting mechanism part 551 is in a state where it is rotated clockwise about an inner end portion thereof in the left-right direction. The second operation interconnecting mechanism part 552 is thereby in a state where it is made to slide rightward. Moreover, the third operation interconnecting mechanism part 553 is in a state where it is rotated clockwise as viewed from the front and is moved rightward. Furthermore, the first leg 26 is in a state where it is rotated clockwise about the upper end portion thereof as viewed from the front.

The fourth operation interconnecting mechanism part 554 is in a state where it is rotated clockwise about an inner end portion thereof in the left-right direction. The second operation interconnecting mechanism part 552 is thereby in a state where it is made to slide leftward. Moreover, the sixth operation interconnecting mechanism part 556 is in a state where it is rotated clockwise as viewed from the front and is moved leftward. Furthermore, the second leg 27 is in a state where it is rotated counterclockwise about the upper end portion thereof as viewed from the front.

With reference to FIG. 10C, when the flight device 10 is to be transitioned from the transition state to the flight state, the rotating shafts of the motor 53 and the motor 54 that are not illustrated herein are made to further rotate clockwise as viewed from above to rotate the first operation interconnecting mechanism part 551 and the fourth operation interconnecting mechanism part 554 clockwise.

The first operation interconnecting mechanism part 551 is in a state where it is further rotated clockwise about the inner end portion thereof in the left-right direction. The second operation interconnecting mechanism part 552 is thereby in a state where it is made to further slide rightward. Moreover, the third operation interconnecting mechanism part 553 is in a state where it is further rotated clockwise as viewed from the front and is further moved rightward. Furthermore, the first leg 26 is rotated clockwise about the upper end portion thereof as viewed from the front and extends horizontally rearward.

Meanwhile, the fourth operation interconnecting mechanism part 554 is in a state where it is further rotated clockwise about the inner end portion thereof in the left-right direction. The second operation interconnecting mechanism part 552 is thereby in a state where it is made to further slide leftward. Moreover, the sixth operation interconnecting mechanism part 556 is in a state where it is further rotated counterclockwise as viewed from the front and is further moved rightward. Furthermore, the second leg 27 is rotated counterclockwise about the upper end portion thereof as viewed from the front and extends horizontally rearward.

Figure 11A:
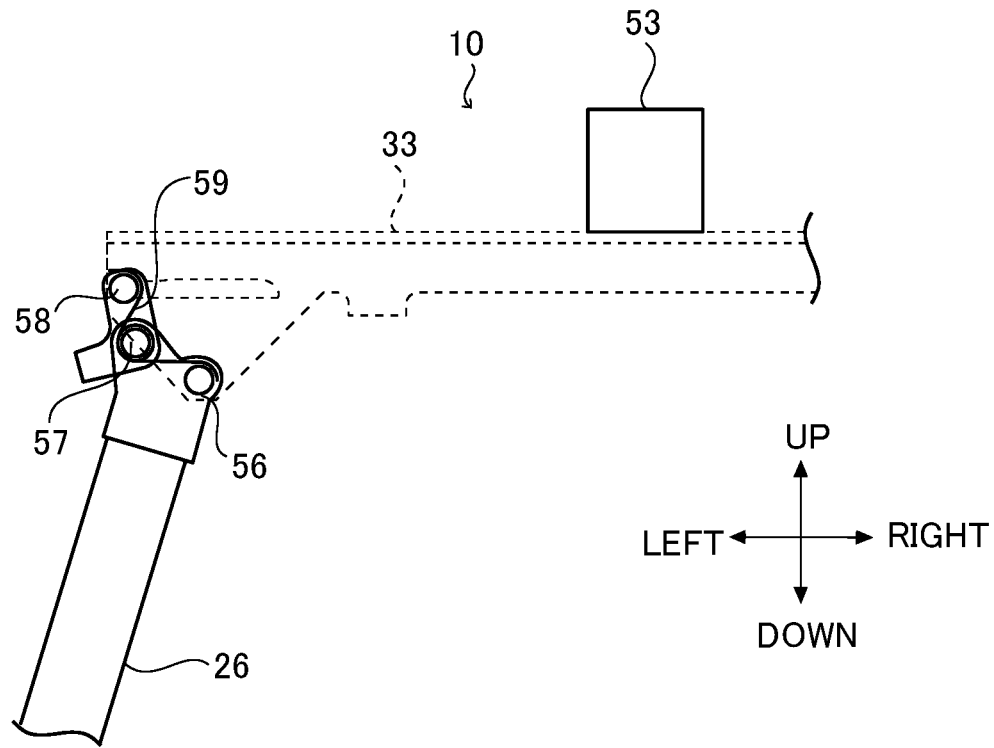
FIGS. 11A and 11B are views illustrating a portion of a flight device according to yet another embodiment of the present invention.
Figure 11B:
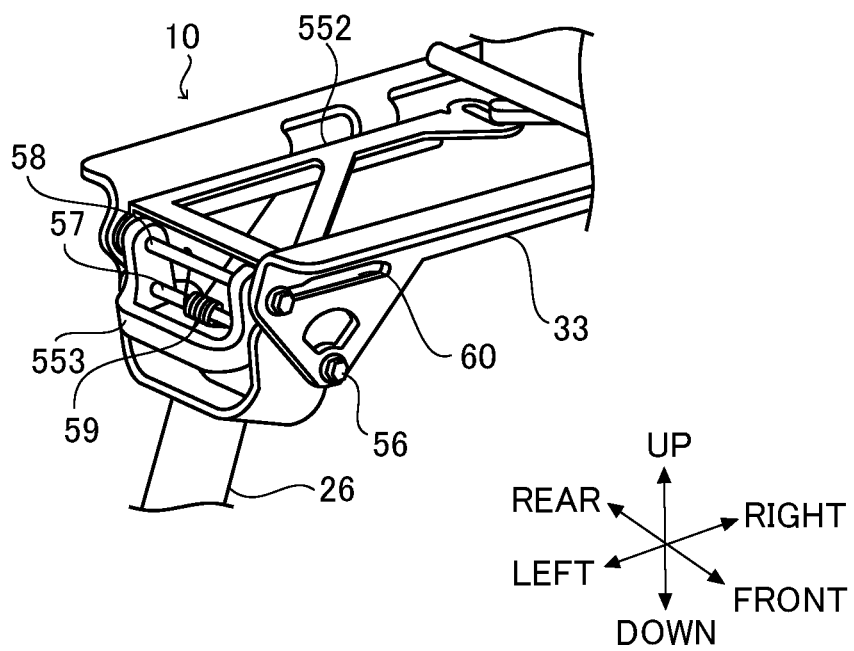

FIGS. 11A and 11B are views illustrating a portion of a flight device 10 according to yet another embodiment, FIG. 11A is a side view, and FIG. 11B is a perspective view. A basic configuration of the flight device 10 illustrated in FIGS. 11A and 11B is the same as that illustrated in FIGS. 10A to 10C and a spring 59 that biases an operation of the first leg 26 is disposed in this example.

With reference to FIGS. 11A and 11B, a shaft 58 penetrates a left end portion of the attachment frame 33, an upper end portion of the third operation interconnecting mechanism part 553, and an upper end portion of the second operation interconnecting mechanism part 552 while allowing these portions to turn. Moreover, the shaft 58 is installed to be slidable in the left-right direction relative to slide grooves 60. The slide grooves 60 are portions opened in a slit shape extending in the left-right direction in the left end portion of the attachment frame 33 and are formed on both sides of the attachment frame 33 in the front-rear direction.

A shaft 56 penetrates left end lower portions of the attachment frame 33 and the upper end right side of the first leg 26 on the while allowing these portions to turn.

A shaft 57 penetrates lower end portions of the third operation interconnecting mechanism part 553 and the upper end portion left side of the first leg 26 while allowing these portions to turn.

An intermediate portion of the spring 59 is wound around the shaft 57, an upper end portion thereof is in contact with the shaft 58 from the right side, and a lower end portion thereof is in contact with the shaft 56 from above. The spring 59 thereby generates biasing force acting such that the first leg 26 is set to the landing state. Accordingly, even when the rotation force of the motor 53 and the motor 54 described above is small or lost, it is possible to set the first leg 26 to the landing state and prevent the camera or the like attached to the flight device 10 from breaking in landing.

Moreover, although not illustrated herein, a right end side portion of the flight device 10 also has a configuration similar to that in FIGS. 11A and 11B.

Although the embodiments of the present invention have been described above, the present invention is not limited to the aforementioned embodiments. Moreover, the aforementioned embodiments may be combined with one another.

For example, with reference to FIG. 9, although the motor 53 and the motor 54 are included as means for driving the operation interconnecting mechanism 55, only one of the motors may be included.

EXPLANATION OF THE REFERENCE NUMERALS 10 flight device
11 arm
12 propeller
14 fuselage base
16 operation interconnecting mechanism
161 first operation interconnecting mechanism part
162 second operation interconnecting mechanism part
163 third operation interconnecting mechanism part
17 rotor motor
18 sensor
20 engine
21 operation control device
22 communication device
23 power generation unit
24 output control device
25 battery unit
26 first leg
27 second leg
28 drive unit
281 first drive unit
282 second drive unit
29 dead center
30 leg link mechanism
301 first leg link part
302 second leg link part
31 motor
32 magnet
33 attachment frame
34 attracted portion
35 rotation member
36 protrusion-shaped portion
37 attachment member
38 link hole
39 link hole
40 link hole
41 link hole
42 link hole
43 insertion hole
44 link hole
45 link joint
46 joint
47 link hole
48 link hole
49 link hole
50 link hole
51 link hole
52 link hole
53 motor
54 motor
55 operation interconnecting mechanism
551 first operation interconnecting mechanism part
552 second operation interconnecting mechanism part
553 third operation interconnecting mechanism part
554 fourth operation interconnecting mechanism part
555 fifth operation interconnecting mechanism part
556 sixth operation interconnecting mechanism part
56 shaft
57 shaft
58 shaft
59 spring
60 slide groove

The invention claimed is:

1. A flight device comprising:
a fuselage base;
a first leg provided on the fuselage base and transformable between a flight state and a landing state;
a second leg provided on the fuselage base as a separate body from the first leg and transformable between the flight state and the landing state;
a drive unit configured to drive transformation operations of the first leg and the second leg; and
an operation interconnecting mechanism configured to interconnect the first leg and the second leg in terms of operation, wherein
the drive unit includes a leg link mechanism configured to turnably connect the first leg to the fuselage base, a motor configured to cause the leg link mechanism to transform, and a magnet or a spring operably connected to the leg link mechanism,
the leg link mechanism comprises a first leg link part and a second leg link part,
an upper end side of the first leg link part is rotatably connected to the fuselage base, a lower end side of the first leg link is rotatably connected to an upper end portion of the second leg link part at a link joint, and a lower end portion of the second leg link part is rotatably connected to the first leg,
when the leg link mechanism transforms the first leg from the flight state to the landing state, the first leg link part rotates and the second leg link part moves downward to rotate the first leg to the landing state, and
when, during the transformation of the first leg from the flight state to the landing state, the first and second leg link parts are arranged in a straight line and the link joint overlaps a dead center, the magnet or the spring exerts a force on the first leg such that the link joint is moved away from the dead center and the first leg is set to the landing state.

2. The flight device according to claim 1, wherein the drive unit includes a first drive unit configured to drive the transformation operation of the first leg and a second drive unit configured to drive the transformation operation of the second leg.

3. The flight device according to claim 2, wherein
the second leg is transformable between the flight state and the landing state by using drive force transmitted from the first drive unit via the operation interconnecting mechanism, and
the first leg is transformable between the flight state and the landing state by using drive force transmitted from the second drive unit via the operation interconnecting mechanism.

4. The flight device according to claim 1, wherein
the first leg and the second leg are turnably attached to the fuselage base, and
the first leg and the second leg transition to the flight state by turning to become closer to parallel to a bottom surface of the fuselage base, and transition to the landing state by turning to become closer to a standing state with respect to the bottom surface of the fuselage base.

5. The flight device according to claim 1, wherein
the motor is located at a central portion of the fuselage base, and the operation interconnecting mechanism transmits power of the motor to each of the first leg and the second leg.

* * * * *